Oct. 23, 1923.
L. CRANE
1,471,649
SWAY BAR BEARING FOR GANG SAWS
Filed May 10, 1922      2 Sheets-Sheet 1
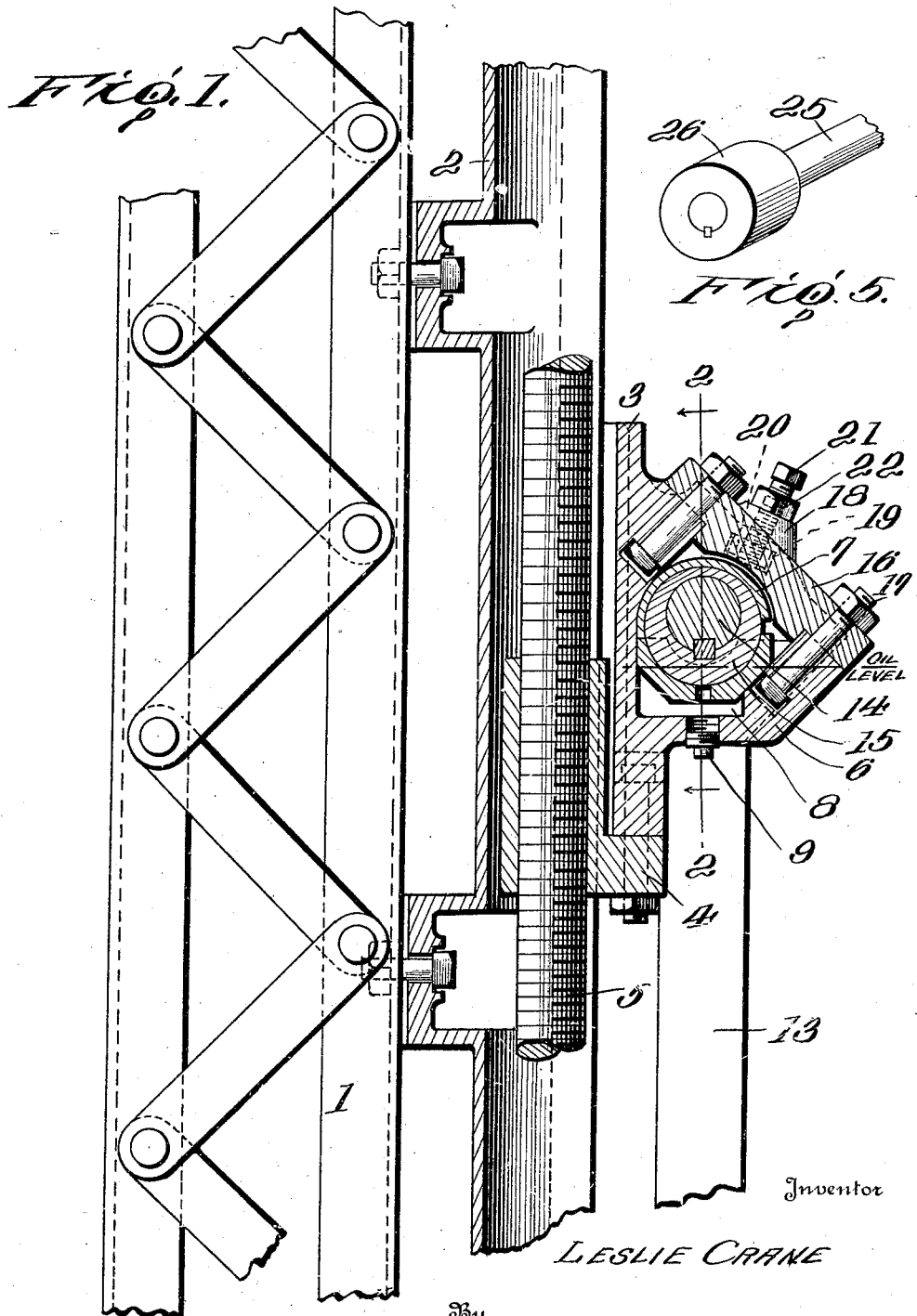
Inventor
LESLIE CRANE
By
Attorney Oct. 23, 1923.
L. CRANE.
SWAY BAR BEARING FOR GANG SAWS
Filed May 10, 1922
1,471,649
2 Sheets-Sheet 2
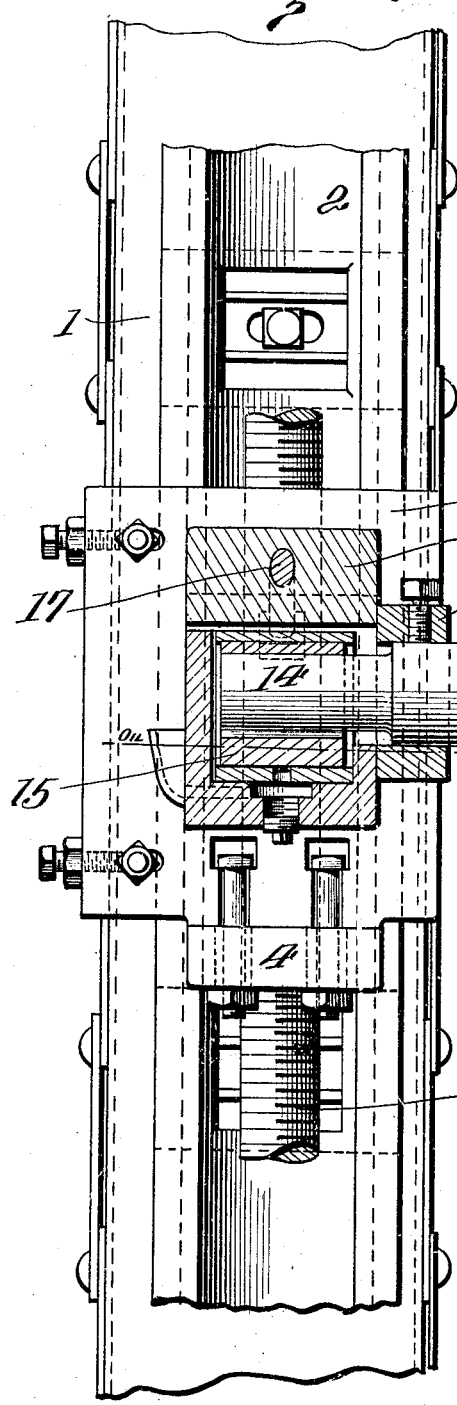
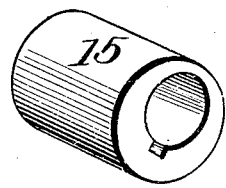
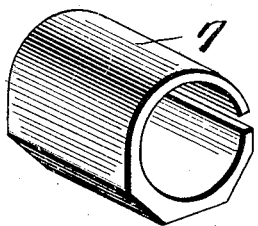
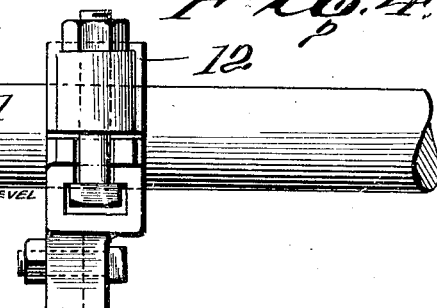
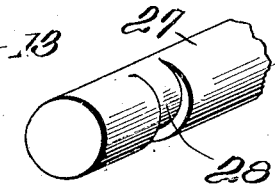
Inventor
LESLIE CRANE.
By
Attorney Patented Oct. 23, 1923.

1,471,649

UNITED STATES PATENT OFFICE.

LESLIE CRANE, OF RUTLAND, VERMONT, ASSIGNOR OF ONE-HALF TO F. R. PATCH MANUFACTURING COMPANY, OF RUTLAND, VERMONT, A CORPORATION OF VERMONT.

SWAY-BAR BEARING FOR GANG SAWS.

Application filed May 10, 1922. Serial No. 559,922.

*To all whom it may concern:*

Be it known that I, LESLIE CRANE, a citizen of the United States, residing at Rutland, in the county of Rutland and State of Vermont, have invented certain new and useful Improvements in Sway-Bar Bearings for Gang Saws, of which the following is a specification, reference being had therein to the accompanying drawing.

This invention relates to certain new and useful improvements in sway bar bearings for gang saws, the object being to provide novel means for mounting the sway bar in respect to the frame of the saw so that the sway bar will be supported on the adjustable saddle in a bearing which is thoroughly lubricated at all times and in such a manner that the bearing is protected from the sand and water used in the process of sawing stone.

Another and further object of the invention is to provide a bearing with an oil receptacle having an adjustable bushing with means for adjusting the same so as to take up the wear.

A still further object of the invention is to provide the ends of the sway bar with excentric sleeves in order to allow the oil receptacle to be made smaller by allowing the sleeves to extend down into the oil pocket so as to be thoroughly lubricated at all times.

Other and further objects and advantages of the invention will be hereinafter set forth and the novel features thereof defined in the appended claims.

In the drawings,

Figure 1 is a vertical section through my improved construction of bearing showing the same in position on the guide way of the sawing machine;

Figure 2 is a section taken on line 2—2 of Figure 1;

Figure 3 is a perspective view of the excentric sleeve;

Figure 4 is a perspective view of the split bushing;

Figure 5 is a detail perspective view of a slightly modified form showing a concentric sleeve arranged on the sway bar; and Figure 6 is a perspective view of a sway bar showing the same notched in order to allow it to drop down into the oil pocket.

In the drawing 1 indicates the corner post of an ordinary construction of sawing machine now in use to which is connected a guide 2 by bolts as clearly shown, said guide having a saddle 3 slidably mounted thereon to which is connected nut 4 through which passes an adjusting screw 5.

The saddle 3 is provided with a hollow enlargement 6 in which is arranged a split bushing 7 having a curved upper portion and a three-sided lower portion fitting within the hollow enlargement in such a manner that it is prevented from turning therein. The enlargement is provided with an oil chamber 8 having a drain plug 9 which is adapted to be filled with lubricant and maintained at the oil level as shown by dotted and dash lines and it will be seen that the oil level extends above the bushing and the bushing is provided with an opening or duct in order to allow the oil to pass into the same in order to thoroughly lubricate the bearing sleeve as will be hereinafter fully described.

The inner side of the enlargement is provided with an opening through which is adapted to extend the sway bar 11 to which is secured clamping lugs 12 carrying suspension bar 13 which is connected to the jack on the saw frame in the usual manner. The sway bar 11 is provided with a thrust collar 10 fixed thereon by a set screw as clearly shown.

The inner end of the sway bar 11 is reduced as shown at 14 and keyed thereon is an excentric sleeve 15 which fits snugly within the split brass bushing 7 so as to form a bearing in which said sleeve rocks and it will be noted that by arranging an excentric sleeve on the end of the reduced end of the sway bar, the sleeve extends down below the oil level so that it will be lubricated which allows the sway bar to be maintained close to the guide. This construction also enables the pocket or bearing formed by the enlargement to be maintained within a reasonable size.

The hollow enlargement is enclosed by a cap 16 secured in position thereon by bolts 17, said cap being provided with apertured bosses 18, the bores of which extend into rectangular enlargements 19 in which are maintained nuts 20. Working on the nuts 20 are bolts 21 which are adapted to engage the split bushing and hold the same tightly against the sleeve carried by the sway bar and it will be seen that as the bushing and sleeve wear, the bushing can be adjusted so as to take up all lost motion, the bolts 21 being locked in position by set nuts 22.

In Figure 5 I show a sway bar 25 provided with a concentric sleeve 26 in order to allow the sleeve to drop in the oil pocket so as to be thoroughly lubricated.

In Figure 6 I show a sway bar 27 notched at 28 in order to allow the same to drop into the oil pocket.

From the foregoing description it will be seen that I have provided a novel form of sway bar mounting in the form of a bearing formed on the saddle having a pocket forming an oil chamber in which is arranged an adjustable bushing forming a bearing for an excentric sleeve keyed on the reduced end of a sway bar in such a manner that the sway bar is mounted close to the guide.

What I claim is:—

1. A sway bar bearing for gang saws comprising a chamber having an irregular shaped bushing mounted therein provided with an oil pocket, a sway bar having an excentric sleeve mounted in said bushing, a cover for said chamber and adjusting bolts mounted in said cover adapted to engage said bushing.

2. The combination with a stone sawing machine having a saddle, of a chamber formed on said saddle having a removable cover, a split bushing mounted within said chamber, a sway bar having a reduced end carrying an excentric sleeve mounted in said bushing and bolts adjustably mounted in said cover for adjusting said split bushing around said sleeve.

3. A saddle for gang saws having a hollow enlargement to form an oil chamber, a non-rotatable split bushing mounted in said chamber, a sway bar having a reduced end carrying an excentric sleeve mounted in said bushing, said bushing being provided with an oil duct in communication with said chamber and a cover for enclosing said chamber having screws for engaging said bushing for adjusting said bushing around said sleeve.

4. In a stone sawing machine, the combination with a saddle having an enlargement to provide a chamber adapted to contain lubricant, a non-rotatable bushing mounted in said chamber having an oil duct, said chamber being provided with an opening in one side wall, a sway bar extending through said opening having a reduced end, an excentric sleeve fixed on said reduced end working in said bushing and a removable cover for said chamber.

5. In a device of the kind described, the combination with a saddle having an enlargement to produce an oil pocket, a bushing arranged within said pocket provided with an oil duct, a sway bar extending into said pocket having a reduced end carrying an excentric sleeve working in said bushing, a cover for closing said pocket and an adjusting screw for adjusting said bushing around said sleeve.

6. A sway bar bearing for gang saws comprising a chamber having a non-rotatable split bushing mounted therein, a sway bar carrying an excentric sleeve mounted within said bushing and a cover for closing said chamber having a set screw for adjusting said bushing around said sleeve.

7. A saddle for gang saws having a hollow enlargement to form an oil chamber having a drain plug, a split bushing having flat faces arranged within said chamber and provided with an oil duct, one wall of said chamber being provided with an opening, a sway bar extending through said opening, an excentric sleeve keyed on said sway bar mounted within said bushing, a cover for closing said chamber, a nut arranged in said cover and a screw working in said nut adapted to engage said bushing for adjusting said bushing around said sleeve.

In testimony whereof I hereunto affix my signature.

LESLIE CRANE.